United States Patent Office 3,210,425
Patented Oct. 5, 1965

3,210,425
AMINO POLYACETYLENIC COMPOUNDS
John H. Wotiz, Mentor, and Francis Huba, Fairport Harbor, Ohio, assignors to Diamond Alkali Company, Cleveland, Ohio, a corporation of Delaware
No Drawing. Filed Sept. 7, 1960, Ser. No. 54,384
4 Claims. (Cl. 260—583)

This invention relates to novel nitrogen-containing linear nonconjugated polyacetylenic compounds, their preparation and use.

Broadly, this invention relates to nitrogen-containing linear polyacetylenic compounds of the structure:

(I)

$$M^1-C\equiv C-\left\{\left[(CH_2)_a(R^1)_b(Y)_j(CH_2)_c-C\equiv C\right]_d(CH_2)_e(R^2)_f(Y)_j(CH_2)_g-C\equiv C\right\}_y-M^2$$

wherein $M^1$ and $M^2$ are the same or different and are selected from the group consisting of hydrogen and amine-substituted alkyl radicals, notably amine-terminated alkyl radicals, e.g., —R—NH$_2$, R—NH—,

(wherein R is alkyl) and aryl radicals such as phenyl or naphthyl; alkyl radicals; acyl radicals such as

haloacyl radicals such as

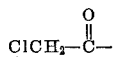

aroyl radicals such as

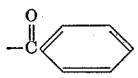

or heterocyclic rings including the nitrogen atom as a member; salts of such compounds, e.g., carbamates, sulfates, nitrates or hydrochloride salts, with the proviso that only one of $M^1$ and $M^2$ can be hydrogen; Y is

or

$a$ is a number from 0 to 20, inclusive; $b$ is a number from 0 to 2, inclusive; $c$ is a number from 0 to 20, inclusive; $d$ is a number from 0 to 20, inclusive; $e$ is a number from 0 to 20, inclusive; $f$ is a number from 0 to 2, inclusive; $g$ is a number from 0 to 20, inclusive; $j$ is 0 or 1; $y$ is a number from 1 to 100; $R^1$ and $R^2$ are the same or different radicals selected from the group consisting of alkylene radicals, e.g., radicals having the structure —C$_m$H$_{2m}$— (and corresponding branched chain radicals), wherein $m$ is a number from 1 to 50; arylene radicals, e.g.,

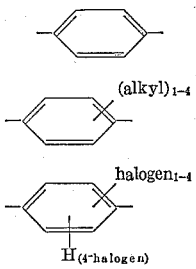

as well as corresponding ortho and meta radicals; oxygen; sulfur;

mercury; boron; boron-containing radicals such as

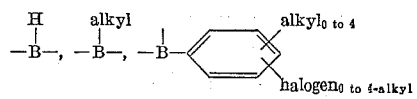

heterocyclic radicals such as

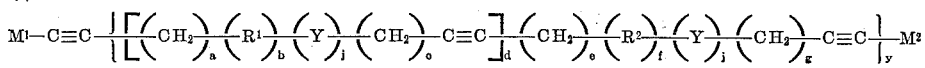

aryl-substituted alkylene radicals, e.g., or substituted alkylene radicals, e.g., $$-\overset{Cl}{\underset{Cl}{C}}-,\ -\overset{H}{\underset{O\text{-alkyl}}{C}}-,\ -\overset{O\text{-alkyl}}{\underset{O\text{-alkyl}}{C}}-,\ -\overset{H}{\underset{S\text{-alkyl}}{C}}-$$

tin; silicon;

$$-\overset{H}{\underset{H}{Si}}-;\ -\overset{alkyl}{\underset{H}{Si}}-;\ -\overset{alkyl}{\underset{alkyl}{Si}}-;\ -O-M^3-O-$$

(wherein $M^3$ is selected from the group consisting of calcium, barium, zinc, tin, lead, $$-\overset{R^4}{\underset{R^4}{Si}}-,\ -\overset{R^4}{B}-,\ -\overset{R^4}{Al}-$$

$R^4$ being selected from the group consisting of hydrogen, lower alkyl, i.e., up to about 10 carbon atoms, or aryl radicals, e.g., phenyl or naphthyl).

More particularly, a preferred group of novel compounds of this invention has the structure:

(II)

$$\left[HCl\right]_{x^1}\cdot R^6-\overset{R^7}{N}-\left[(R^8)_a C\equiv C\right]_{n^1}\left[R^9\right]_{m^1}R^{10}\left[HCl\right]_{x^2}$$

wherein $R^6$ and $R^7$ are the same or different radicals selected from the group consisting of hydrogen; aryl, such as phenyl or naphthyl; acyl radicals such as

haloacyl radicals such as

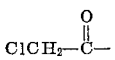

aroyl such as benzoyl and halogen-substituted benzoyl radicals; and alkyl; $R^8$ is selected from the group consisting alkylene radicals and

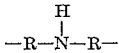

and

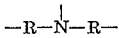

(wherein R is alkylene); $R^9$ is an alkylene radical; $R^{10}$ is selected from the group consisting of hydrogen,

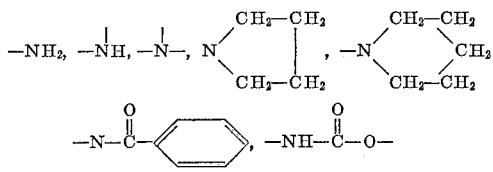

especially —NH$_2$ and

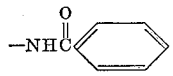

$m^1$ is a number from 2 to 20; $n^1$ is a number from 2 to 50; and $r^1$ and $r^2$ are the same or different numbers, either 0 or 1, thus when either or both $r^1$ or $r^2 = 1$, defining a mono- or di-hydrochloride.

The terms "alkyl" and "alkylene," i.e., mono- and divalent radicals, respectively, as used in the specification and claims, unless otherwise defined, are intended to refer to various monovalent straight chain, e.g.,

groups, as well as branched chain derivatives thereof wherein $a^1$ is a number from 0 to 15; and to corresponding straight and branched chain divalent groups, e.g.,

wherein $b^1$ is a number from 1 to 50. The term "lower" used with either "alkyl" or "alkylene" is intended to refer to radicals containing up to 10 carbon atoms.

Specific examples of "alkyl" and "alkylene" radicals are those containing 2 to 5 carbon atoms, e.g.:

| Alkylene Radicals | Alkyl Radicals |
|---|---|
| —CH$_2$— | CH$_3$— |
| —CH$_2$—CH$_2$— | CH$_3$—CH$_2$— |
| —CH$_2$—CH$_2$—CH$_2$— | CH$_3$—CH$_2$—CH$_2$— |
| —CH$_2$—CH$_2$—CH$_2$—CH$_2$— | CH$_3$—CH—CH$_2$— |
| —CH$_2$—CH$_2$—CH$_2$—CH$_2$—CH$_2$— |        CH$_3$ |
| —CH$_2$—CH$_2$—CH—CH$_2$— | |
|            CH$_3$ | |
| | CH$_3$—CH$_2$—CH$_2$—CH$_2$— |
| | CH$_3$—CH$_2$—CH$_2$—CH$_2$—CH$_2$— |
| —CH$_2$—CH—CH$_2$— | CH$_3$—CH—CH$_2$—CH$_2$— |
|     CH$_3$ |     CH$_3$ |
| —CH$_2$—CH—CH— | CH$_3$—CH—CH— |
|     CH$_3$ CH$_3$ |     CH$_3$ CH$_3$ |
| —CH—CH— | |
| CH$_3$ CH$_2$—CH$_3$ | |
| —CH$_2$—CH—CH$_2$— | |
|     CH$_2$—CH$_3$ | |

Compounds of this invention are useful in various applications, including pesticidal uses. As used in the specification and claims, the terms "pesticide," "pests," and "pesticidal" are intended to refer to the killing and/or controlling of the growth of plants, bacteria, microorganisms, fungi, or the like. Thus, it will be appreciated that applications commonly termed bactericidal, herbicidal, fungicidal, or the like, are contemplated. Other uses of compounds of this invention include applications as monomers leading to useful polymers, solid rocket fuel components, binders, as coatings, films, fibers, intermediates, polymerization catalysts, high energy fuels, or fuel components, rocket fuel starters, plasticizers, stabilizers, e.g., for tetrachlorethylene, corrosion inhibitors, e.g., in oil wells, and as intermediates in the preparation of high molecular weight saturated amines useful in the pharmaceutical industry.

Specific illustrative compounds embodying the invention are the following:

1-amino-5,11-dodecadiyne

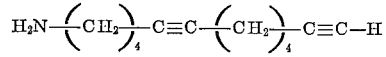

1,16-diamino-5,11-hexadecadiyne

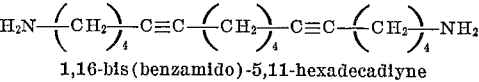

1,16-bis(benzamido)-5,11-hexadecadiyne

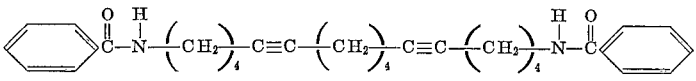

1,16-diamino-5,11-hexadecadiyne dihydrochloride

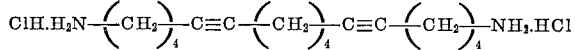

1-amino-5,11-dodecadiyne hydrochloride

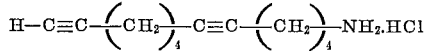

1,28-diamino-5,11,17,23-octacosatetrayne

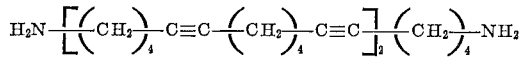

N-(5,11-dodecadiynyl)-pyrrolidine

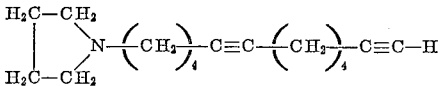

N-(5,11-dodecadiynyl)-pyrrolidine hydrochloride

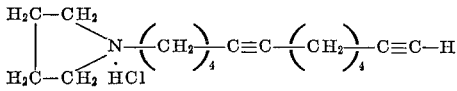

N,N'-bis(5,11-dodecadiynyl)urea

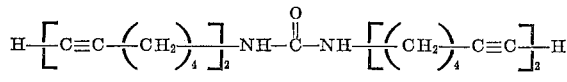

16-amino-5,11-hexadecadiynyl carbamic acid (zwitterion)

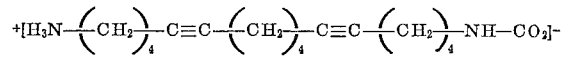

Bis-(16-aminohexadeca-5,11-diynyl)amine

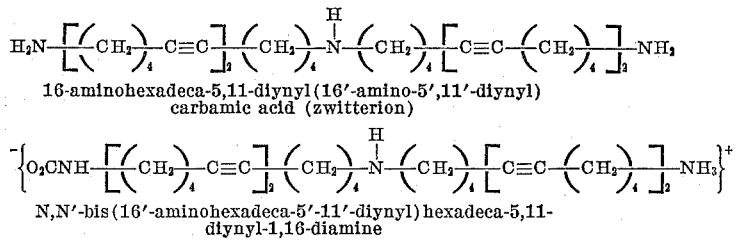

16-aminohexadeca-5,11-diynyl(16'-amino-5',11'-diynyl) carbamic acid (zwitterion)

N,N'-bis(16'-aminohexadeca-5'-11'-diynyl)hexadeca-5,11-diynyl-1,16-diamine 1-amino-5,11,17-octadecatriyne N-(5,11,17-octadecatriynyl)pyrrolidine

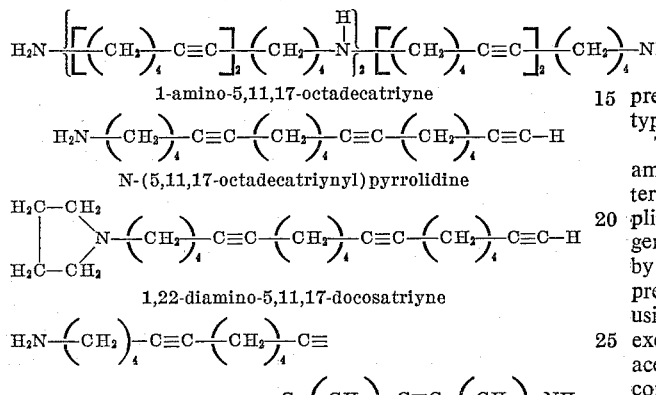

1,22-diamino-5,11,17-docosatriyne 28-amino-5,11,17,23-octacosatetraynyl carbamic acid (zwitterion)

N-(16-amino-5,11-hexadecadiynyl)pyrrolidine

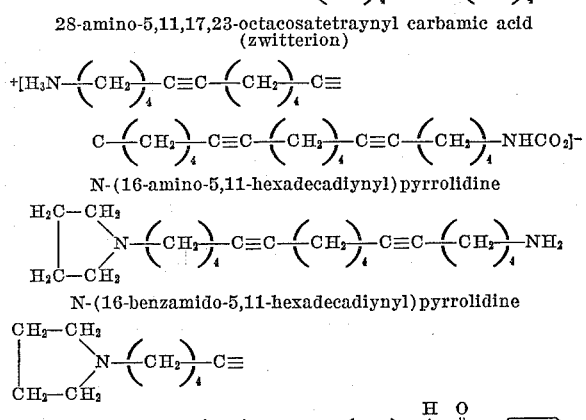

N-(16-benzamido-5,11-hexadecadiynyl)pyrrolidine 22-amino-5,11,17-docosatriynyl carbamic acid (zwitterion)

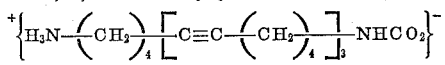

Compounds of this invention generally can be prepared by reacting a linear nonconjugated, halogen-terminated α,ω-polyyne hydrocarbon with ammonia, which is preferred at present, or other nitrogen-containing organic compound serving as a source of an

linkage, especially an —NH₂ group, e.g., a primary (R—CH₂—NH₂), or secondary amine (wherein R is alkyl) such as piperazine, mono- or di-alkyl amines, methyl amine, dimethyl amine, ethyl amine, diethyl amine, ethylmethyl amine, phenylamine, tolylamine, n-propyl amine, heterocyclic nitrogen-containing compounds, or the like. In practice, such a reaction advantageously is carried out, via autoclave or other suitable reactor, in liquid ammonia under autogeneous superatmospheric pressure sufficient to maintain the ammonia as a liquid, and at a temperature high enough to facilitate reaction, e.g., a temperature within the range from about 10° to 100° C., preferably 40° to 90° C. The pressure employed should be sufficient to maintain the ammonia as a liquid. Generally, an autogeneous pressure of about 100 to 1000 p.s.i.g. is advantageous, typically about 400 to 600 p.s.i.g.

The reaction can be carried out by reacting with liquid ammonia or other source of ammonia a formed halogen-terminated polyyne as indicated, or, if desired, accomplished in situ during the formation of the desired halogen-terminated polyyne and the product then separated by distillation or other means. Thus, it will be appreciated that ammonia can be employed as a reactant, using also sodium amide in certain instances, when an excess of alkylene dihalide is reacted with a dimetal acetylide or polyacetylide and/or mixtures thereof with corresponding monometal acetylides and polyacetylides generally as described in Ser. No. 831,930, filed August 6, 1959.

The preparation of compounds of this invention is illustrated by the following sequence of equations:

(1)
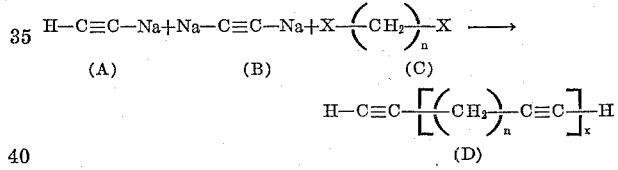

(2)
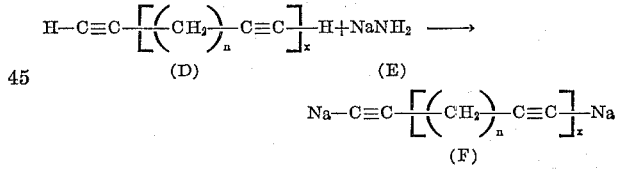

(3)
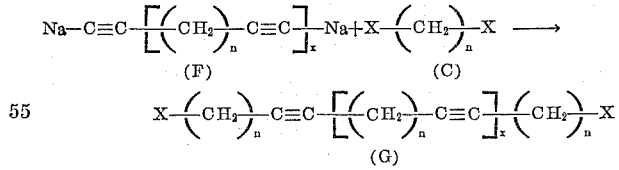

(4)
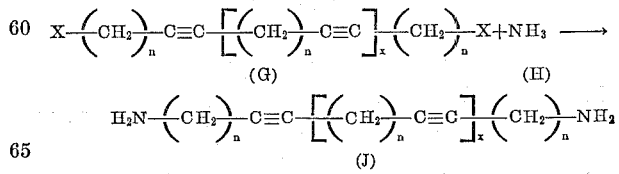

It will be understood that halogen-terminated compounds (G) can also be prepared directly by employing an excess of the alkylene dihalide (C) in reaction (1). Corresponding reactions can be carried out using other reactants (A), (B) and (C) as described in U.S. Ser. No. 831,930, filed August 6, 1959. Thus, for example, (B) can be Na—C≡C—(CH₂)₄—C≡C—Na or other polyacetylide. While sodium is shown in the foregoing reactions (1)–(4), it is to be understood that the several alkali metals or other metals as shown in Ser. No. 831,930 also can be employed.

As indicated, compounds of this invention generally can be prepared by reacting a linear, nonconjugated α,ω-halogen-containing polyyne hydrocarbon with a source of an amine radical. In practice, such compounds can be prepared by reacting a formed linear, nonconjugated α,ω-polyyne (D) with a compound such as potassium amide, lithium amide, or the like; alkaline earth metal amide, e.g., calcium amide, strontium amide, barium amide, or the like; alkali metal hydrides, e.g., sodium hydride, potassium hydride, lithium hydride, or the like; alkaline earth metal hydrides, e.g., calcium hydride, strontium hydride, barium hydride, or the like; or Grignard reagents comprising alkyl magnesium halides, preferably ethyl magnesium bromide, an alkyl halide, e.g., ethyl bromide, the Grignard reagents being prepared by reacting with dry magnesium such as magnesium turnings.

The reaction can be carried out in liquid ammonia, tetrahydrofuran, tetrahydropyran, ethyl ether or other alkyl ether, or hydrocarbon solvent such as pentane or hexane. When a Grignard reagent is formed, advantageous solvents include ethyl ether, tetrahydrofuran, tertiary amines, e.g., triethyl amine, tripropyl amine, or the like. Preparation of the organometallic derivative of the polyyne generally can be carried out at a temperature from room temperature to about 150° C. with superatmospheric pressure if necessary or desired.

Illustrative of the foregoing type of compounds (A) or (D) useful in the production of compounds of this invention as starting materials, either as such, or during their preparation are the following:

ACETYLENE (H—C≡C—H)

1,7-octadiyne

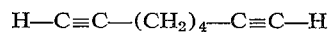

1,9,17-octadecatriyne

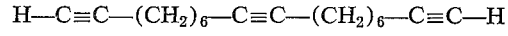

1,8,15-hexadecatriyne

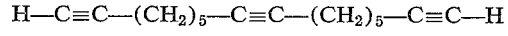

1,7,13-tetradecatriyne

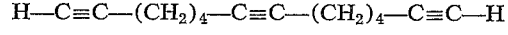

1,6,11-dodecatriyne

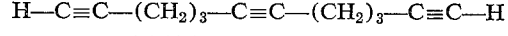

1,6,11,16-heptadecatetrayne

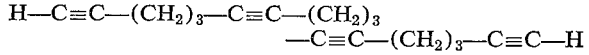

1,7,13,19-eicosatetrayne

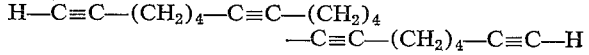

1,8,15,22-tricosatetrayne

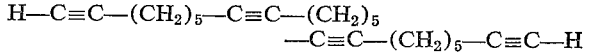

1,9,17,25-hexacosatetrayne

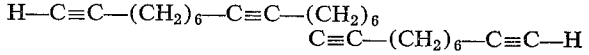

1,10,19,28-nonacosatetrayne

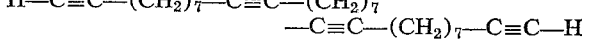

1,7,13,19,25-hexacosapentayne

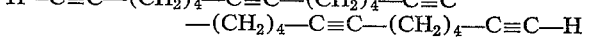

While compounds of this invention may be employed in a variety of applications, biologically active or otherwise, when employed as biologically-active materials it will be understood, of course, that such compounds may be utilized in diverse formulations, both liquid and solid, including finely-divided powders and granular materials as well as liquids such as solutions, concentrates, dispersions, emulsifiable concentrates, emulsions, slurries and the like, depending upon the application intended and the formulation medium desired.

These compounds may be used alone or in combination with other known biologically-active materials such as other acetylenically unsaturated compounds, organic phosphate pesticides, fertilizers, chlorinated hydrocarbon insecticides, foliage and soil fungicides and the like.

Thus, it will be appreciated that compounds of this invention may be employed to form biologically-active substances containing such compounds as essential active ingredients, which compositions may also include finely-divided dry or liquid carriers, extenders, fillers, conditioners, including various clays, such as talc, spent catalyst, alumina silica materials, liquids, solvents, diluents, or the like, including water and various organic liquids such as benzene, toluene, chlorinated benzene, acetone, cyclohexanone, chlorinated xylene, carbon tetrachloride, ethylene dichloride, tetrachloroethylene, carbon disulfide and alcohols at various temperatures thereof.

When liquid formulations are employed or dry materials prepared which are to be used in liquid form, it is desirable in certain instances additionally to employ a wetting, emulsifying or dispersing agent to facilitate use of the formulation, e.g., Triton X-155 (alkyl aryl polyether alcohol, U.S. Patent 2,504,064). Other suitable surface active agents may be found in an article by John W. McCutcheon in Soap and Chemical Specialties, vol. 4, Nos. 7-10 (1955).

The term "carrier" as employed in the specification and claims is intended to refer broadly to materials constituting a major proportion of a biologically-active or other formulation and hence includes finely-divided materials, both liquids and solids as aforementioned, conveniently used in such applications.

In order that those skilled in the art may more completely understand the present invention and the preferred methods by which the same may be carried into effect, the following specific examples are offered:

EXAMPLE 1

*Preparation of 1-amino-5,11-dodecadiyne*

PART A

A five-gallon autoclave, equipped with an agitator and temperature control means, is charged with 5.71 mols of NaC≡C—(CH$_2$)$_4$—C≡C—Na which is stirring in 2.5 gallons of liquid ammonia. There are then added at —60° C. 13 mols (2784 g.) of Br—(CH$_2$)$_4$—Br, i.e., an excess to insure initial formation of a halogen-terminated compound which, in turn, reacts with ammonia to form the desired amine. The temperature is then raised to and maintained at 70° C. for two hours and the resulting reaction mixture allowed to cool overnight. Workup of the reaction mixture yields a two-layer mixture of products, no starting material being recovered and 93% of ionic bromine being found in the aqueous layer. The organic layer is diluted with ethyl ether, dried, and distilled under vacuum. By the foregoing procedure, there is obtained the desired product having a boiling point of 82°-85° C. at 0.05 mm. Hg, $n_D^{25}$=1.4836. The approximate yield based on the initial reaction is crude 15%—pure 10%. Analytical data indicate preparation of the desired 1-amino-5,11-dodecadiyne (C$_{12}$H$_{19}$N) and are as follows:

| Element | Actual (percent by weight) | Calculated (percent by weight) |
|---|---|---|
| C | 80.4 | 81.32 |
| H | 10.3 | 10.75 |
| N | 7.7 | 7.93 |

The experimentally-determined molecular weights are 166 and 170, while the calculated molecular weight is 177. The infrared spectrum is consistent with the indicated compound.

PART B

Bactericidal activity: 1-amino-5,11-dodecadiyne is examined for ability to inhibit the growth of four bacterial species (*Erwinia amylovora*, *Xanthomonas phaseoli*, *Micrococcus pyogenes* var. *aureus*, and *Escherichia coli*) at a concentration of 250 p.p.m. The formulation (0.1 g. test compound combined with 4 ml. of acetone and 2 ml. of solution of 0.5% by volume of Triton X–155 in water) is diluted without maintaining the concentration of the emulsifier or solvent. The first two and fourth above-named test species are Gram negative rods; the third species is Gram positive. They are all cultured on nutrient agar slants except *X. phaseoli* which is grown on potato dextrose agar. The cultures used for tests are sub-cultured for two sequential 24-hour periods to insure uniform test populations. Bacterial suspensions are made from the second sub-culture in the culture tube by addition of distilled water and gentle agitation, after which they are filtered through double layers of cheesecloth and adjusted to standard concentrations by turbimetric measurement. Each of four test tubes arranged in a rack receive one ml. of the 1250 p.p.m. test formulation. After the test formulations have been measured into a test tube, 3½ ml. of distilled water and ½ ml. of bacterial suspension for each respective test organism is added to each test tube. The medication tubes are then set aside at room temperature for four hours. After this exposure period, transfers are made by means of a standard four mm. platinum loop to 7 ml. of sterile broth into test tubes arranged in racks similar to those for the medication tubes. The broth tubes are then incubated for 48 hours at 29° C. at which time growth is measured by use of a Bausch & Lomb spectronic "20" direct reading colorimeter. A reading is recorded for each test tube after shaking. Three replicates of each organism serve as controls. Calculations are made on percent of the mean check readings. This figure subtracted from 100 gives percent control as compared to checks. The compound tested gives a 100% control against each species as compared to a check.

PART C

Fungicidal activity (*A. solani*): A tomato foliage disease test is conducted measuring the ability of the product of Part A (1-amino-5,11-dodecadiyne) to protect tomato foliage against infection by the early blight fungus *Alternaria solani*. Tomato plants 5 to 7 inches high of the variety Bonny Best are employed. The plants are sprayed with 100 ml. of test formulation at 2000 p.p.m. and 400 p.p.m. test chemical in combination with 5% acetone, 0.01% Triton X–155 and the balance water, at 40 lbs. air pressure while being rotated on a turntable in a spray chamber. After the spray deposit is dry, the treated plants and comparable untreated controls are again sprayed as described above, with a sporangial suspension containing approximately 20,000 conidia of *A. solani* per ml. The plants are held in a 100% humid atmosphere for 24 hours at 70° F. to permit spore germination and infection. One day after removal from the humid atmosphere lesion counts are made on the three uppermost fully-expanded leaves. Data based on the number of lesions obtained on the control plants show an 83% disease control at 2000 p.p.m. and 82% disease control at 400 p.p.m.

PART D

Fungicidal activity (*P. infestans*): Fungicidal utility is further demonstrated by the ability of the product of Part A (1-amino-5,11-dodecadiyne) to protect tomato plants against the late blight fungus, *Phytophthora infestans*. The method employs tomato plants 5 to 7 inches high of the variety Bonny Best. 100 ml. of the test formulation (2000 p.p.m. and 400 p.p.m. of the test compound of Part A 5% acetone, 0.01% Triton X–155, the balance water) are sprayed on the plants at 40 lbs. air pressure while the plants are being rotated on a turntable in a spray chamber. After the spray deposit is dry, the treated plants and comparable untreated controls are again sprayed, as described above, with a sporangial suspension containing approximately 150,000 sporangia of *P. infestans* per ml. for 30 seconds at 20 lbs. The plants are held in a 100% humid atmosphere for 24 hours at 60° F. to permit spore germination and infection. After 2 to 4 days, lesion counts are made on the three uppermost fully-expanded leaves. Comparing the number of lesions on the test plants and control plants shows disease control of 87% and 63%, respectively, on the test plants.

PART E

Herbicidal activity (post-emergence): Bean plants, variety Tendergreen, just as the trifoliate leaves are beginning to unfold, are sprayed with test formulation at a concentration of 4800 p.p.m. (0.48%) or about 4 lbs. active chemical per 100 gallons of water. Four test plants are all sprayed simultaneously with 80 ml. of a cyclohexanone formulation (384 mg. 1-amino-5,11-dodecadiyne combined with 10 ml. cyclohexanone, 8 ml. of Triton X–155 solution of Part B and 62 ml. distilled water) at 40 lbs. per square inch, while being rotated on a turntable in a spray hood. The concentrations of the solvent, cyclohexanone, and emulsifier, Triton X–155, are always maintained at 12.5% and 0.05% by volume, respectively, irrespective of the concentration of the toxicant.

After the plants are dry, they are removed to the greenhouse. Records are taken 14 days after treatment. Phytotoxicity is rated on a scale from 0 to 11 based on the Weber-Fechner law which states that visual acuity depends on the logarithm of the intensity of the stimulus. In grading phytotoxicity the stimulus changes at the 50% level. The grades are as follows based on percent of leaf area destroyed: 0=no injury, 1=0 to 3, 2=3 to 6, 3=6 to 12, 4=12 to 25, 5=25 to 50, 6=50 to 75, 7=85 to 87, 8=87 to 94, 9=94 to 97, 10=97 to 100, and at 11 the plant is dead. 1-amino-5,11-dodecadiyne gives a phytotoxicity rating of 9 and a stunting rating of 9.

PART F

Herbicidal activity (pre-emergence): To evaluate the effect of 1-amino-5,11-dodecadiyne upon the germination and subsequent growth of seeds in soil, two mixtures of seed are used. One contains three broadleaf species and the other contains three grass species. Each mixture is planted diagonally in one half of a 9″ x 9″ x 2″ aluminum cake pan filled to within ½ inch of the top with composted greenhouse soil. After planting, the seed is uniformly covered with about ¼ inch of soil and watered. After 24 hours, 40 ml. of test formulation containing 167 mg. of the product of Part A is sprayed at 10 lbs. per square inch (p.s.i.) uniformly over the surface of the pan. This is equivalent to 32 lbs. per acre, which is the rate used in primary screening. The formulation contains the toxicant in equal volumes of water and acetone with 2 drops of Triton X–155.

The broadleaf seed mixture contains turnip, flax and alfalfa. The grass mixture contains millet, ryegrass and timothy. Two weeks after treatment, estimates are made on seedling stand and percent control is calculated. 1-amino-5,11-dodecadiyne gives a 75% control of broadleaf plants.

EXAMPLE 2

*Preparation of 1,16-diamino-5,11-hexadecadiyne, and 16-amino-5,11-hexadecadiynyl carbamic acid*

PART A

A five-gallon autoclave, equipped with an agitator and temperature control means, is charged at −40° C. with a suspension of 4 mols of $$NaC \equiv C-(CH_2)_4-C \equiv C-Na$$

(prepared by the reaction of 4 mols of $$H-C\equiv C-(CH_2)_4-C\equiv C-H$$

with 8 mols of sodium amide) in 2.5 gallons of anhydrous liquid ammonia. The temperature is maintained at $-40°$ C., via external cooling, while 8 mols of $$Br-(CH_2)_4-Br$$

are added portionwise. The temperature is then raised to and maintained at $-33°$ C. for two hours. The autoclave is then sealed and the temperature is kept near $50°$ C. (which raises the autogeneous ammonia pressure to about 400 p.s.i.g.) and maintained at this temperature for two hours. The contents of the autoclave are then cooled overnight, the ammonia is vented and the residue treated with water. Analysis for ionic bromine indicates that at least 93% of the dibromobutane reacts. The organic portion (about 1.5 liters) is diluted with an equal volume of ethyl ether and washed with three one-liter portions of 10% aqueous sodium hydroxide, dried and separated into several parts.

One part is fractionally distilled to separate out the desired 1,16-diamino-5,11-hexadecadiyne which boils at $152°$ C. at 0.05 mm. Hg and has a melting point of $3°$ C., $n_D^{25}=1.480$. The results of chemical analysis indicate preparation of the desired $C_{16}H_{28}N_2$ and are as follows:

| Element | Actual (percent by weight) | Calculated (percent by weight) |
|---|---|---|
| C | 78.5 | 77.4 |
| H | 10.5 | 11.3 |
| N | 9.3 | 11.3 |

The actual molecular weight found is 271 while the calculated molecular weight is 248. The infrared spectrum also confirms the indicated structure. The compound is extremely sensitive to carbon dioxide and when exposed to the atmosphere the compound becomes cloudy.

A second part of the crude reaction mixture is saturated with carbon dioxide which causes the precipitation of a white solid. This solid is separated by filtration and recrystallized from aqueous ethanol and is identified as 16-amino-5,11-hexadecadiynyl carbamic acid (zwitterion)

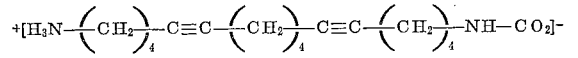

This material melts at $120°-123°$ C. and the results of chemical analysis indicate preparation of the desired $C_{17}H_{28}N_2O_2$ and are as follows:

| Element | Actual (percent weight) | Calculated (percent by weight) |
|---|---|---|
| C | 69.8 | 69.9 |
| H | 9.5 | 9.6 |
| N | 10.4 | 9.2 |

The experimentally-determined molecular weight is 265 while the calculated molecular weight is 292. Infrared spectrum confirms formation of the indicated compound. This compound is very soluble in alcohol, acetone and warm water.

PART B

Bactericidal activity: Using 1,16-diamino-5,11-hexadecadiyne in the procedure of Example 1, Part B, a 100% control is obtained against each of the four types of bacteria. Similar results are obtained with 16-amino-5,11-hexadecadiynyl carbamic acid.

PART C

Fungicidal activity (*P. infestans*): Using the procedure of Example 1, Part D, 1,16-diamino-5,11-hexadecadiyne gives a 90% and 84% control of the late blight fungus at concentrations of 2000 p.p.m. and 400 p.p.m., respectively.

EXAMPLE 3

*Preparation of 1,16-diamino-5,11-hexadecadiyne*

A five-gallon autoclave, equipped with an agitator and temperature control means, is charged with 2.5 gallons of liquid ammonia. 4 mols of $NaC\equiv C(CH_2)_4C\equiv CNa$ are prepared using 4 mols of $HC\equiv C(CH_2)_4C\equiv CH$ and 8 mols of sodium amide. The temperature is maintained at $-33°$ C. After one hour of additional stirring, 8 mols of $Br(CH_2)_4Br$ are added portionwise at $-50°$ to $-55°$ C. The temperature is then raised to and maintained at $-40°$ to $-33°$ C. for two hours. The autoclave is then sealed and the temperature is kept near $50°$ C., which raises the autogeneous ammonia pressure to about 400 p.s.i.g. The temperature is maintained at $50°$ C. for two hours. The contents of the autoclave are then allowed to cool overnight, the ammonia is vented and the residue is treated with water and the resulting two layers separated. 93% of the available bromine is found in the water layer. The organic portion of the mixture (about 1 kg.) is diluted with 2 liters of ethyl ether and washed with three 1-liter portions of a 10% aqueous NaOH solution. The ether solution is dried with anhydrous $Na_2SO_4$, filtered and diluted with 5 liters of ethyl ether. The solution is stirred in a 10-liter flask, equipped with condenser, and dry $CO_2$ is passed into the solution. A solid is immediately formed. After ½ hour of passing $CO_2$ introduction, the solid is removed by filtration. The solid comprises the $CO_2$ derivatives (carbamates) of $\alpha,\omega$-polyacetylenic diamines and all other products are in the filtrate.

The solid $CO^2$ derivative is treated with a tenfold volume of 10% aqueous NaOH solution at $70°$ C. and the formed oily amine layer is separated and purified by distillation. This compound (1,16-diamino-5,11-hexadecadiyne) boils at $152°$ C. at 0.05 mm. Hg pressure; melting point $3°$ C., $n_D^{25}=1.4980$. The results of the chemical analysis indicate preparation of the desired $C_{16}H_{28}N_2$ and are as follows:

| Element | Actual (percent by weight) | Calculated (percent by weight) |
|---|---|---|
| C | 78.1 | 77.4 |
| H | 10.9 | 11.3 |
| N | 10.7 | 11.3 |

The experimentally-determined molecular weight is 239 while the calculated is 248. Infrared spectra confirm the assigned structure. The compound is very sensitive to $CO_2$ and when exposed to air it becomes cloudy.

EXAMPLE 4

*Preparation of 1,16-diamino-5,11-hexadecadiyne*

6 mols of $NaC\equiv C(CH_2)_4C\equiv C-Na$ (prepared from 6 mols of $HC\equiv C(CH_2)_4C\equiv C-H$ and 12 mols of $NaNH_2$) are suspended in one gallon of liquid ammonia at $-33°$ C. This suspension is added portionwise to 12 mols of $Br(CH_2)_4Br$ stirred with two gallons of liquid ammonia in a five-gallon autoclave at $-33°$ C. After three hours of additional stirring at $-33°$ C., the autoclave is sealed, heated to $50°$ C. (400 p.s.i.g.) and maintained at about this temperature for three hours. The autoclave is then cooled and the liquid ammonia is vented. The residue is treated with water. 98% of the available bromine is found in the water layer. The organic portion of the mixture is separated and treated as in Example 3.

EXAMPLE 5

*Preparation of 1-amino-5,11-dodecadiyne*

The ether-product filtrate, after removal of $CO_2$ solid derivative of $\alpha,\omega$-polyacetylenic diamines (as in Example 3), is distilled. The main product boils at $82°-85°$ C. at 0.05 mm. Hg, $n_D^{25}=1.4836$, and is identified as 1-amino-5,11-dodecadiyne. The results of the chemical analysis indicate the formation of the desired $C_{12}H_{19}N$ and are as follows:

| Element | Actual (percent by weight) | Calculated (percent by weight) |
|---|---|---|
| C | 80.4 | 81.32 |
| H | 10.3 | 10.75 |
| N | 7.7 | 7.93 |

The actual molecular weight found is 166, 170 while the calculated is 177. The infrared spectrum is consistent with the assigned structure.

EXAMPLE 6

PART A

*Preparation of N-(5,11-dodecadiynyl)pyrrolidine, N-(16-amino-5,11-hexadecadiynyl)pyrrolidine, and N - (benzamido-5,11-hexadecadiynyl)pyrrolidine*

The first compound is obtained via distillation from the ether-product filtrate (of Example 3). The product boils at 116° C. at 0.03 mm. Hg, $n_D^{25}=1.4880$. The results of the chemical analysis indicate the formation of the desired $C_{16}H_{25}N_1$ and are as follows:

| Element | Actual (percent by weight) | Calculated (percent by weight) |
|---|---|---|
| C | 83.3 | 83.13 |
| H | 10.7 | 10.82 |
| N | 5.2 | 6.05 |

The determined molecular weight is 229; the calculated molecular weight is 231.

PART B

Using the procedure of Example 1, Part B, N-(5,11-dodecadiynyl)pyrrolidine exhibits a 100% kill of all four species.

PART C

Using the procedure of Example 1, Part D, N-(5,11-dodecadiynyl)pyrrolidine exhibits a 97% and 71% disease control at concentrations of 0.2% and 0.04%, respectively.

PART D

Using the procedure of Example 1, Part E, N-(5,11-dodecadiynyl)pyrrolidine kills tomato plants at a concentration of 0.48%.

PART E

The N - (16-amino-5,11-hexadecadiynyl)pyrrolidine is obtained via continued distillation from the ether-product filtrate (of Example 3). The product boils at 175 to 176° C. at 0.03 mm. Hg, $n_D^{25}=1.4977$. The result of chemical analysis indicates the formation of the desired $C_{20}H_{34}N_2$ and are as follows:

| Element | Actual (percent by weight) | Calculated (percent by weight) |
|---|---|---|
| C | 79.3 | 79.5 |
| H | 11.2 | 11.5 |
| N | 9.3 | 9.3 |

The infrared spectrum is consistent with the assigned structure.

PART F

The N-(benzamido-5,11-hexadecadiynyl)pyrrolidine is obtained by the reaction of 20 g. benzoyl chloride with 13 g. N-(16-amino-5,11-hexadecadiynyl)pyrrolidine described in Part E, in the presence of 100 ml. of a 10% solution of sodium hydroxide. The desired product was purified by distillation, B.P. 256° to 258° at 0.07 mm. Hg, $n_D^{25}=1.5356$. The result of chemical analysis indicate the formation of the desired $C_{27}H_{38}ON_2$ and are as follows:

| Element | Actual (percent by weight) | Calculated (percent by weight) |
|---|---|---|
| C | 79.8 | 79.8 |
| H | 9.3 | 9.4 |
| N | 7.0 | 6.9 |

The infrared spectrum is consistent with the indicated structure.

EXAMPLE 7

*Preparation of 1,16-bis(benzamido)-5,11-hexadecadiyne*

0.06 mol of 1,16-diamino-5,11-hexadecadiyne is emulsified in 300 ml. of 10% NaOH aqueous solution and 0.15 mol benzoylchloride is added and agitated while cooled.

The formed solid is filtered by suction and crystallized from a 3:1 ethanol-ethyl ether mixture. The resulting product melts at 106°–107° C. and is identified as 1,16-bis(benzamido)-5,11-hexadecadiyne. The results of the analysis indicate the preparation of the desired compound $C_{30}H_{36}N_2O_2$ and are as follows:

| Element | Actual (percent by weight) | Calculated (percent by weight) |
|---|---|---|
| C | 79.0 | 79.0 |
| H | 7.9 | 7.9 |
| N | 6.7 | 6.15 |

The infrared spectrum is consistent with the indicated structure.

EXAMPLE 8

*Preparation of 1,16-diamino-5,11-hexadecadiyne hydrochloride*

0.1 mol of 1,16-diamino-5,11-hexadecadiyne is dissolved in 2 liters of anhydrous ethyl ether and anhydrous HCl gas is introduced while the mixture is stirred and cooled. The thus-obtained solid is filtered, washed with ethyl ether on the filter and dried under vacuum. The product, 1,16-diamino-5,11-hexadecadiyne hydrochloride, melts at 240°–245° C. The results of analysis indicate the preparation of the desired $C_{16}H_{30}N_2Cl_2$ and are as follows:

| Element | Actual (percent by weight) | Calculated (percent by weight) |
|---|---|---|
| C | 60.0 | 59.8 |
| H | 9.5 | 9.36 |
| Cl | 22.2 | 22.12 |
| N | 9.2 | 8.72 |

The infrared spectrum confirms the indicated structure.

EXAMPLE 9

PART A

*Preparation of 1-amino-5,11-dodecadiyne hydrochloride*

0.1 mol of 1-amino-5,11-dodecadiyne is dissolved in two liters of anhydrous ethyl ether and anhydrous HCl gas is introduced while the mixture is stirred and cooled. The obtained solid is filtered, washed with ether on the filter, dried and crystallized from acetone. The product melts at 123°–125° C. and is identified as 1-amino-5,11-dodecadiyne hydrochloride. The results of the analysis indicate the preparation of the desired compound $C_{12}H_{20}ClN$ and are as follows:

| Element | Actual (percent by weight) | Calculated (percent by weight) |
|---|---|---|
| C | 67.3 | 67.40 |
| H | 9.5 | 9.45 |
| Cl | 17.1 | 16.60 |
| N | 7.7 | 6.55 |

Infrared spectrum is consistent with the indicated structure.

PART B

Using the procedure of Example 1, Part D, 1-amino-5,11-dodecadiyne hydrochloride, at concentrations of 0.1% and 0.02%, gives a disease control of 86% and 76%, respectively.

EXAMPLE 10

*Preparation of 1,28-diamino-5,11,17,23-octacosatetrayne*

A five-gallon autoclave, equipped with an agitator and temperature control means, is charged at $-40°$ C. with 432 g. (2 moles) of 1,4-dibromo-butane and one gallon of anhydrous ammonia (B.P. $-33°$ C.). To this mixture is added a suspension of one mole of

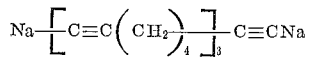

in one gallon of liquid ammonia, prepared from 78 g. (2 moles) of $NaNH_2$ and 266 g. (1 mole) of

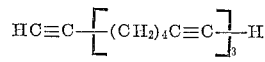

After stirring for 3 hours at $-33°$ C., the autoclave is sealed and agitation is continued for 5 hours at $45°$ C. under an autogeneous pressure of about 250 p.s.i.g. The ammonia is then vented and the residue treated with 3 liters of water and 2 liters of ethyl ether. The formed layers are separated and the aqueous layer analyzed. It is found from the ionic bromide ion content that 75% of the starting dibromobutane reacted.

The desired product is in the upper organic layer which is washed with dilute NaOH and dried over anhydrous sodium carbonate. The solution is saturated with dry $CO_2$ which precipitates a white solid (carbamates of $\alpha,\omega$-polyacetylenic diamines). The solid is separated by filtration and suspended in 500 ml. of a 10% aqueous solution of KOH kept at $70°$ C. This causes the formation of an oily layer. The solution is cooled and the oily product dissolved in 200 ml. of ethyl ether. The ether layer is separated, washed with two 50 ml. portions of water, dried over anhydrous sodium carbonate, and distilled. The desired product boils at $220°-226°$ C. at 0.02 mm. Hg, and solidifies. The compound, after crystallization from petroleum ether-ethyl ether mixture (4:1), melts at $90°-92°$ C. and is identified as 1,28-diamino-5,11,17,23-octacosatetrayne. The results of the analysis indicate formation of the desired $C_{28}H_{44}N_2$ and are as follows:

| Element | Actual (percent by weight) | Calculated (percent by weight) |
| --- | --- | --- |
| C | 82.2 | 82.3 |
| H | 10.5 | 10.85 |
| N | 6.1 | 6.85 |

The experimentally-determined molecular weight is 355 and the calculated molecular weight is 408. The experimentally-determined base equivalent is 208 and the calculated base equivalent is 204. The infrared spectrum is consistent with the indicated structure. The compound is sensitive to air $(CO_2)$. To convert it into its carbamate, $$^+\{H_3N(CH_2)_4[C\equiv C(CH_2)_4]_4NHCO_2\}^-$$

the diamine is dissolved in ethyl ether and the ether solution saturated with dry $CO_2$. The formed white solid is separated by filtration and when crystallized from ethanol, it melts at $104-107°$ C. The results of chemical analysis confirm the presence of $C_{29}H_{44}N_2O_2$.

| Element | Actual (percent by weight) | Calculated (percent by weight) |
| --- | --- | --- |
| C | 76.4 | 77.1 |
| H | 9.9 | 9.8 |
| N | 6.3 | 6.2 |

The found base equivalent is 222 whereas the calculated base equivalent is 226. The infrared spectrum analysis is consistent with the indicated structure.

EXAMPLE 11

The hydrochloride of N-(5,11-dodecadiynyl)pyrrolidine (Example 6) is prepared via the method of Example 8 to obtain the following structure (M.P. $83°-85°$ C.):

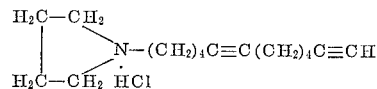

The results of analysis indicate preparation of the desired compound $C_{16}H_{26}ClNO$ and are as follows:

| Element | Actual (percent by weight) | Calculated (percent by weight) |
| --- | --- | --- |
| C | 71.5 | 71.6 |
| H | 9.3 | 9.7 |
| Cl | 13.6 | 13.3 |
| N | 5.7 | 5.4 |

EXAMPLE 12

*Preparation of bis(16-aminohexadeca-5,11-diynyl)amine, 16-aminohexadeca-5,11-diynyl(16'-amino-5',11'-diynyl)carbamic acid and N,N'-bis(16'-aminohexadeca-5',11'-diynyl)hexadeca-5,11-diynyl-1,16-amine*

470 g. (12 mols) of $NaNH_2$ and 636 g. (6 mols) of 1,7-octadiyne are suspended in 1.5 gallons of liquid ammonia at its boiling point ($-33°$ C.). After two hours of stirring, this slurry (actually $NaC\equiv C(CH_2)_4C\equiv CNa$) is added to a mixture of 2592 g. (12 mols) of 1,4-dibromobutane in 1.5 gallons of liquid ammonia contained in a five-gallon autoclave kept at $-45°$ C. with the aid of external cooling. Agitation is continued another 7 hours at which time the autoclave is sealed, external cooling is removed and the temperature raised to $50°$ C. which creates an autogeneous pressure of ammonia of 200 p.s.i.g. The internal pressure is then raised to 2000 p.s.i.g. by compressing dry nitrogen into the autoclave. Agitation is maintained for an additonal 7 hours.

To isolate the desired products the autoclave is vented and the ammonia evaporated. The residue is treated with 1.5 gallons of water which creates two layers. The analysis of the lower aqueous layer for the presence of ionic bromine ($Br^-$) reveals that 100% of the organic bromine is converted into bromide ions. The desired products are in the upper layer which is diluted with one gallon of ethyl ether. The ether layer is washed with two 200 ml. portions of 10% NaOH solution, dried over anhydrous sodium carbonate and filtered.

The resulting clear, pale yellow filtrate is saturated with anhydrous carbon dioxide which causes the precipitation of a white solid. The solid is a mixture of carbamates of polyacetylenic polyamines with two terminal amine groups. This solid is added to one liter of a 15% aqueous sodium hydroxide solution kept at $70°$ C. This causes the formation of an oily layer. The solution is cooled and 500 ml. of ethyl ether are added in which the oily material dissolves.

The ether layer is separated from the aqueous layer, and dried over anhydrous sodium carbamate. The products are separated by means of fractional distillation. The fraction which boils at $150°-152°$ C. at 0.05 mm. Hg, $n_D^{25}=1.4971$, is 1,16-diamino-5,11-hexadecadiyne. The fraction which boils at $196°-200°$ C. at 0.04 mm. Hg is

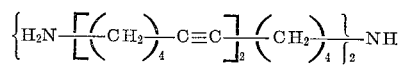

The result of chemical analysis indicates the pressure of $C_{32}H_{53}N_3$.

| Element | Actual (percent by weight) | Calculated (percent by weight) |
|---|---|---|
| C | 79.6 | 80.0 |
| H | 11.1 | 11.2 |
| N | 8.1 | 8.8 |

The calculated base equivalent is 160 whereas the experimentally-determined base equivalent is 166. The infrared spectrum confirms the assigned structure.

This amine is also converted to a solid carbamate derivative by treating its ethyl ether solution with dry $CO_2$. The white solid melts at 80°–84° C. The results of chemical analysis indicate the presence of $C_{33}H_{53}O_2N_3$:

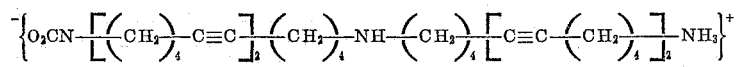

| Element | Actual (percent by weight) | Calculated (percent by weight) |
|---|---|---|
| C | 75.3 | 75.6 |
| H | 10.0 | 10.1 |
| N | 8.7 | 8.0 |

The calculated base equivalent is 174 whereas the experimentally-determined base equivalent is 190. The infrared spectrum confirms the structure.

The residue in the distilling flask, after the removal of the

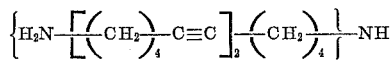

is a viscous, honey-like liquid. The result of chemical analysis indicates the presence of $C_{48}H_{76}N_4$:

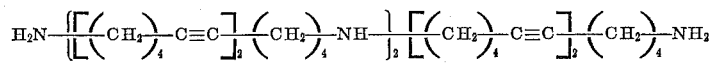

| Element | Actual (percent by weight) | Calculated (percent by weight) |
|---|---|---|
| C | 80.6 | 81.3 |
| H | 10.5 | 10.8 |
| N | 7.8 | 7.9 |

The calculated base equivalent is 177 whereas the found base equivalent is 198. The infrared spectrum confirms the assigned structure.

EXAMPLE 13

*Preparation of 11-amino-5,11,17-octadecatriyne, N-(5,11,17-octadecatriynyl)pyrrolidine and 1,22-diamino-5,11,17-docosatriyne*

A suspension of $Na[C\equiv C(CH_2)_4]_2C\equiv CNa$ in liquid ammonia is made by adding 195 g. (5.0 mols) of sodium amide to a mixture of 465 g. (2.5 mols) of 1,7,13-tetradecatriyne in 1.5 gallons of ammonia at −33° C. The slurry is added over a one-hour period to a mixture of 1080 g. (5.0 mols) of 1,4-dibromobutane and 2.0 gallons of liquid ammonia contained in a five-gallon, steel autoclave and kept by external cooling at −33° to −40° C. After a stirring period of two hours at −33° to −40° C., the autoclave is sealed and the temperature gradually raised to about 60° C. over a three-hour period. This creates a 300 p.s.i.g. pressure. Agitation is maintained for an additional twelve hours at a temperature of about 45° to 60° C. The autoclave is then vented and the ammonia evaporated. The residue is treated with one liter of water and four liters of ethyl ether. The resultant two layers are separated. The aqueous layer is analyzed and found to contain 10 mol equivalents of bromide ions which indicates that 100% of the dibromobutane reacted.

The desired products are found in the organic layer. To purify and separate the products the organic layer is dried over anhydrous sodium sulfate and the clear, straw-colored ether solution is saturated with dry $CO_2$. This causes the precipitation of a white solid (carbamates of α,ω-polyacetylenic diamines). The formed solid is separated by filtration and worked up separately. The filtrate is subjected to a fractional distillation which results in a recovery of the starting 1,7,13-tetradecatriyne, boiling point 99° C. at 0.5 mm. Hg. Further distillation yields:

(a) 1-amino-5,11,17-octadecatriyne,

boiling point 146° C. at 0.01 mm. Hg, $n_D^{25}=1.4958$. The results of chemical analysis show the presence of the desired $C_{18}H_{27}N$:

| Element | Actual (percent by weight) | Calculated (percent by weight) |
|---|---|---|
| C | 84.5 | 84.0 |
| H | 10.5 | 10.6 |

The experimentally-found molecular weight is 225 whereas the calculated molecular weight is 257. The result of the infrared analysis confirms the assigned structure.

(b) N-(5,11,17-octadecatriynyl)pyrrolidine:

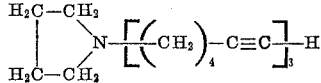

boiling point 154° C. at 0.01 mm. Hg. The results of chemical analysis show the presence of the desired $C_{22}H_{33}N$:

| Element | Actual (percent by weight) | Calculated (percent by weight) |
|---|---|---|
| C | 84.2 | 84.8 |
| H | 10.6 | 10.7 |
| N | 5.2 | 4.5 |

The experimentally-found base equivalent is 311 whereas the calculated base equivalent is 289. The result of the infrared spectrum analysis confirms the assigned structure.

The crude solid carbamates of α,ω-polyacetylenic diamines melt with decomposition at 105° to 121° C. To purify the diamines, the solid is stirred with 500 ml. of a 1% solution of KOH kept at 70° C. This causes the formation of an oily layer. The solution is cooled and the oily product dissolved in 200 ml. of ethyl ether, and the organic portion separated from the aqueous layer. The ether solution is washed with two 50 ml. portions of water, dried over anhydrous $Na_2SO_4$ and distilled. The desired 1,22-diamino-5,11,17-docosatriyne,

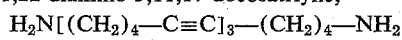

boils at 212° C. at 0.07 mm. Hg, $n_D^{25}=1.5300$. The results of chemical analysis show the presence of the desired $C_{22}H_{36}N_2$:

| Element | Actual (percent by weight) | Calculated (percent by weight) |
|---|---|---|
| C | 80.3 | 80.4 |
| H | 10.9 | 11.0 |
| N | 8.8 | 8.5 |

The experimentally-found molecular weight is 317 whereas the calculated molecular weight is 328. The results of infrared spectroscopic analysis confirms the assigned structure. The compound is sensitive to air ($CO_2$) and forms a white solid when exposed to the atmosphere. To convert it into its carbamate, i.e.,

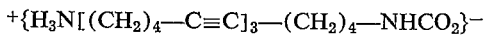
$+\{H_3N[(CH_2)_4—C≡C]_3—(CH_2)_4—NHCO_2\}-$ the diamine is dissolved in ethyl ether and the ether solution saturated with dry $CO_2$. The formed white solid is separated by filtration and washed with ether. It melts with decomposition at 112° to 114° C. The results of chemical analysis confirm the presence of $C_{23}H_{36}O_2N_2$:

| Element | Actual (percent by weight) | Calculated (percent by weight) |
|---|---|---|
| C | 73.0 | 74.1 |
| H | 9.6 | 9.7 |
| N | 7.5 | 7.5 |

The infrared spectrum analysis is consistent with the assigned structure.

It is to be understood that although the invention has been described with specific reference to particular embodiments thereof, it is not to be so limited, since changes and alterations therein may be made which are within the full intended scope of this invention as defined by the appended claims.

What is claimed is:
1. 1,28-diamino-5,11,17,23-octacosatetrayne.
2. 1-amino-5,11,17-octadecatriyne.
3. 1,22-diamino-5,11,17-docosatriyne.
4. 1-amino-5,11,17,23-tetracosatetrayne.

References Cited by the Examiner
UNITED STATES PATENTS

| | | | |
|---|---|---|---|
| 2,343,359 | 3/44 | Arnold | 167—33 |
| 2,343,360 | 3/44 | Arnold | 167—33 |
| 2,497,839 | 2/50 | Ralston et al. | 260—313 |
| 2,766,285 | 10/56 | Hennion | 260—585 |
| 2,830,048 | 4/58 | Biel | 260—247.5 |
| 2,847,419 | 8/58 | Harmon et al. | 260—313 |
| 3,067,265 | 12/62 | Frampton et al. | 260—654 |

OTHER REFERENCES

Guermont: Academic des Sciences, volume 237, pages 1098–1102.

CHARLES B. PARKER, *Primary Examiner.*

IRVING MARCUS, *Examiner.*